(No Model.)
W. H. HALL.
STUMP EXTRACTOR.
No. 328,775. Patented Oct. 20, 1885.
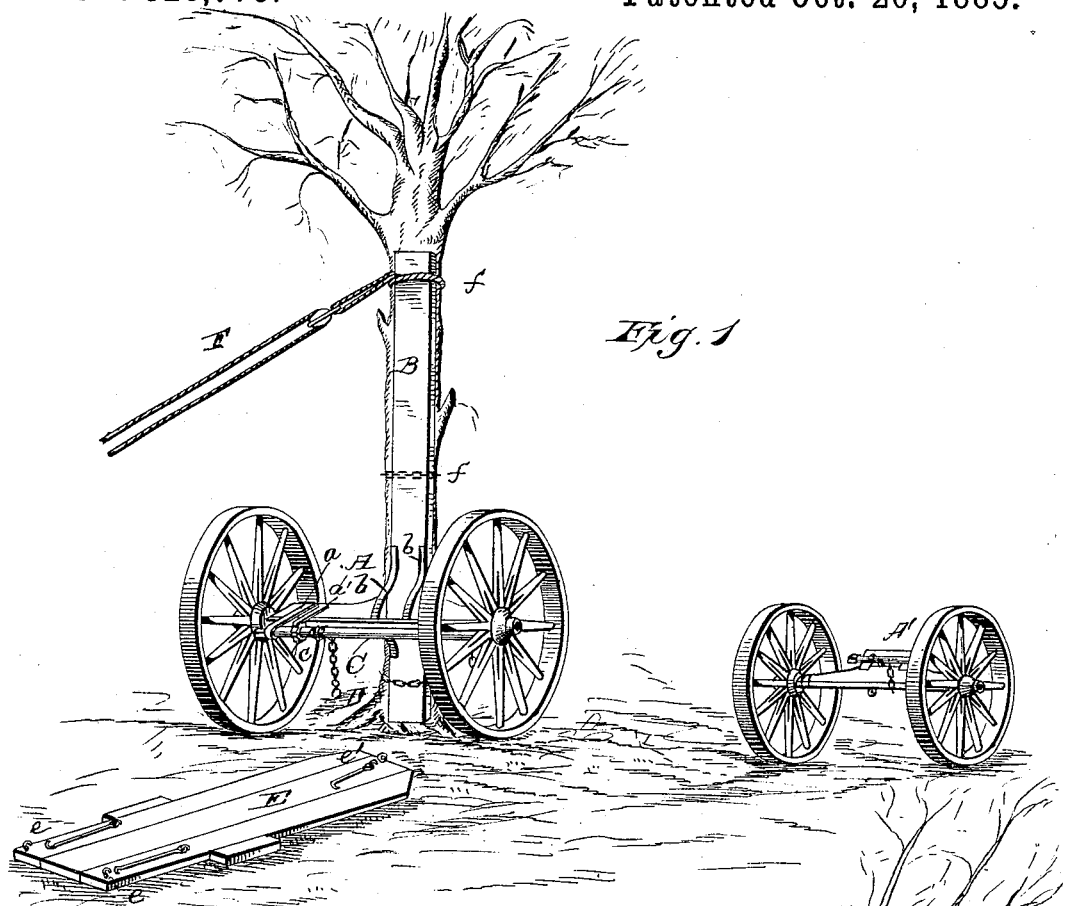
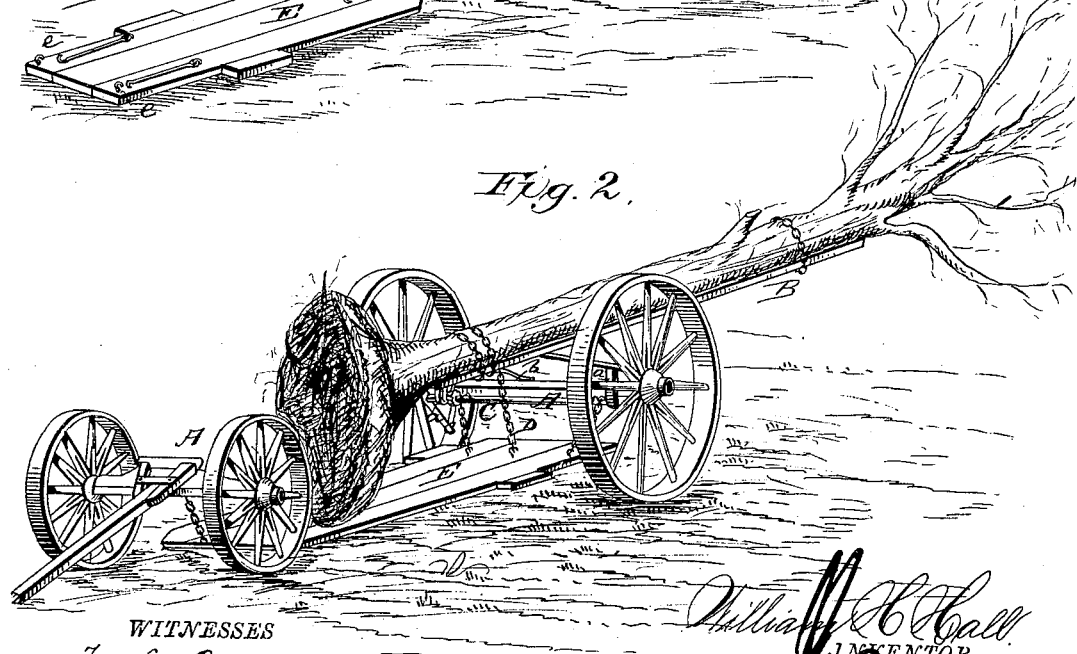
WITNESSES
J. L. Ouraud
E. M. Johnson
William H. Hall
INVENTOR
Attorney

UNITED STATES PATENT OFFICE.

WILLIAM H. HALL, OF BATTLE CREEK, MICHIGAN.

STUMP-EXTRACTOR.

SPECIFICATION forming part of Letters Patent No. 328,775, dated October 20, 1885.

Application filed September 4, 1885. Serial No. 176,133. (No model.)

*To all whom it may concern:*

Be it known that I, WILLIAM H. HALL, a citizen of the United States of America, residing at Battle Creek, in the county of Calhoun and State of Michigan, have invented certain new and useful Improvements in Stump-Extractors and Tree-Carriers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for extracting trees and transporting the same, the object of my invention being to provide a means whereby small trees can be drawn out of the earth and transported without danger of injury to the tree or its roots; and to this end my invention consists in combinining with the forward wheels of an ordinary vehicle an axle which is supported upon wheels, and provided with a board which is adapted to be made fast to the trunk of the tree, and a platform which is suspended between two axles, as will be hereinafter fully set forth and claimed.

In the accompanying drawings, which illustrate my invention, Figure 1 is a perspective view showing the parts of my improvement in position prior to extracting the roots of the tree from the ground, and Fig. 2 is a perspective view showing the parts organized for transporting the tree.

A represents an axle, to the central portion of which is attached a stout board, B, which board is secured and braced thereto by bars $b$. The axle A is provided near its ends with supports $a$, within which is journaled a transverse shaft, C, which is provided with a ratchet-wheel, $c$, which engages with a pawl, $a'$, which is secured to the axle, thus preventing the rotation of said shaft, except in one direction, so as to tighten the chains D, which are attached to said shaft. One end of the shaft C is squared for the reception of a socket-wrench, so that the bar can be turned when desired.

E represents a tray or support, which is provided at its ends with hooks $e$, to which the links of the chains $d$ may be made to engage, and the forward end of this tray is provided with a central hook, $e'$, to which the chain attached to the forward axle, A, may be made fast. The forward axle, A', may be the forward axle of an ordinary farm-wagon.

When it is desired to move a tree or sapling, the board or pole B is made fast to the trunk of the same in three or more places by means of chains or ropes, as shown at $f$ in Fig. 1, and a block and tackle, F, is then attached to the upper end of the board B, and by drawing thereon the long end of the board will be drawn toward the ground, and the short end of the same forced upwardly, thus removing the roots from the ground. After the tree is removed from the ground the platform E is made fast to the axle and elevated, so as to hold the roots above the surface of the ground, so that they cannot be injured while being transported.

By means of the device hereinbefore described it can be readily seen that I provide a cheap and effective means for extracting and transporting trees without liability or danger of injury to the same.

I am aware that prior to my invention it was not broadly new to provide a truck with means for withdrawing roots of young trees from the ground, and I therefore lay no broad claim to such invention; but

What I claim as new, and desire to secure by Letters Patent, is—

1. In a device for extracting and transporting trees, an axle having rigidly attached thereto a board, B, in combination with a platform, E, and forward axle, A', substantially as shown, and for the purpose set forth.

2. The axle A, having a board, B, rigidly attached thereto, a rotary bar secured to the axle and provided with a pawl and ratchet and connecting chains, a platform provided with hooks for engagement with said chain and a forward axle, substantially as shown and for the purpose set forth 3. In a device for extracting and transporting trees, an axle having a board rigidly attached, with central portion thereof, and means for attaching said board to the trunk of the tree, a block and tackle, F, attached to the upper end of the bar, substantially as shown, and for the purpose set forth.

In testimony whereof I affix my signature in presence of two witnesses.

WILLIAM H. HALL.

Witnesses:
JOHN PEAVEY,
C. C. PEAVEY.